March 1, 1927.
A. D. PERTTU
VEHICLE SIGNAL
Filed June 1, 1925
1,619,311
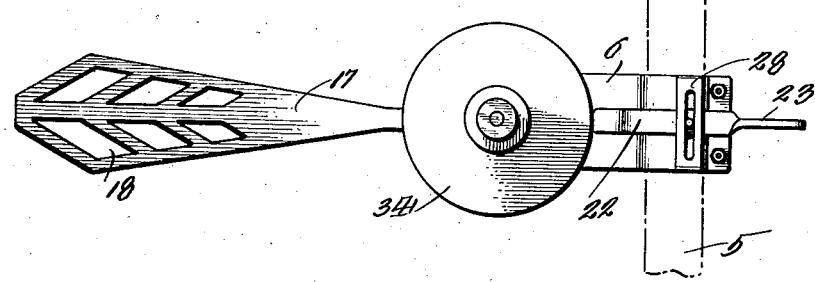
Fig. 1.
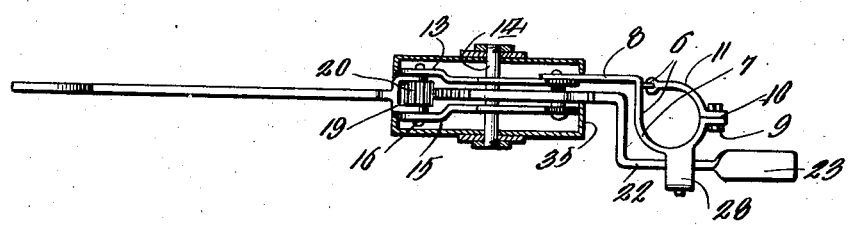
Fig. 2.
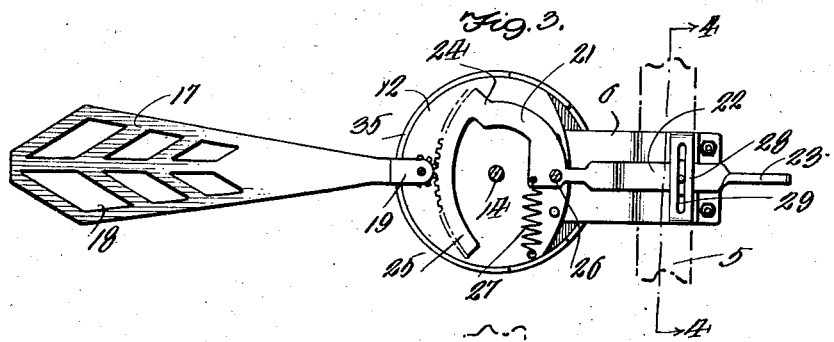
Fig. 3.
Fig. 4.
Arvid D. Perttu, Inventor
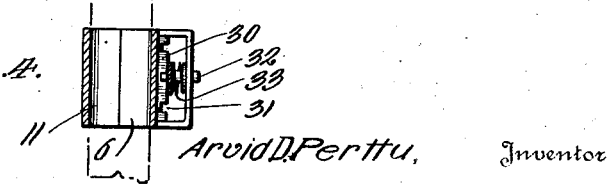
Witnesses
By Richard B. Owen, Attorney Patented Mar. 1, 1927.

1,619,311

UNITED STATES PATENT OFFICE.

ARVID D. PERTTU, OF RIDGEFIELD, WASHINGTON.

VEHICLE SIGNAL.

Application filed June 1, 1925. Serial No. 34,213.

This invention relates to signal apparatus and has particular reference to a device adapted for use upon automobiles and similar vehicles.

An important object of the invention is to provide signal apparatus which may be readily associated with the vehicle to indicate intended direction of travel.

A further object of the invention is to provide a signal apparatus which may be conveniently operated by the driver of the vehicle without great effort.

A still further object of the invention is the provision of apparatus of this character which will plainly indicate to the forward and rear traffic the direction of travel of the vehicle.

Another object of the invention is to provide signal apparatus which is of extremely simple construction, durable and which may be very readily mounted on a vehicle.

Other objects and advantages of this invention will become apparent as the description progresses.

In the accompanying drawing forming a part of this specification and in which like numerals are employed to designate corresponding parts throughout the same:

Figure 1 is a side elevation of the device constructed in accordance with my invention shown in operative position, Figure 2 is a top plan view with a portion of the casing removed to show the interior construction, Figure 3 is a side elevation with a portion of the casing removed, and Figure 4 is a vertical sectional view taken on the line 4—4 of Figure 3.

In the drawing, wherein for the purpose of illustration is shown the preferred embodiment of my invention, the numeral 5 generally designates a portion of a vehicle structure comprising one of the vertical posts of the wind-shield frame upon which it is desirable to mount the signal apparatus.

Referring to the structure embodying my invention, the numeral 6 indicates a bracket plate provided with a substantially semi-circular frame embracing member 7 and a lateral extension 8. The extremity of the bracing member 7 is provided with a flange 9 engageable with a flange 10 formed on one end of a hinged clamp plate 11. This clamp plate is provided on one end with a sleeve engageable with a U-shaped pivot bar secured to the bracket plate 6 so as to permit detachable mounting of the apparatus on a vehicle frame. In the closed position the flanges 9 and 10 formed on the bracket and clamp plates are in opposed relation and connected by a plurality of bolts mounted through suitable openings in these flanges.

Secured to the outer end of the lateral extension 8 is a substantially circular casing plate 12, the outer extremity thereof being off-set as at 13, the purpose of which will be described more fully hereinafter. The casing plate 12 is secured to the lateral extension 8 by means of rivets or in any suitable manner so as to retain the casing plate firmly in a laterally extended position. A stationary shaft 14 extends transversely through the casing plate 12 and is firmly secured to the central portion of the plate. Mounted on the shaft 14 in spaced relation with the casing plate 12 is a companion plate 15, thus providing a casing for suitable signal operating mechanism. This plate is also provided with an off-set extension opposite the extension formed in the plate 12, an auxiliary shaft 16 being mounted centrally through these extensions.

Pivoted to the auxiliary shaft 16 and adapted to swing in an arc thereabout is a tapered signal arm 17 enlarged toward its outer extremity and provided with a plurality of recesses 18 so as to increase the visibility thereof. The inner end of the signal arm is provided with a forked extension 19 provided with opposed openings engageable with the auxiliary shaft.

Rotatably mounted on the shaft 16 between the forked extension 19 is a pinion gear 20 firmly secured to the forked extension of the arm so as to rotate therewith. This pinion gear is actuated through the medium of an operating member 21 embodying an off-set lever 22 provided on one extremity with a handle 23 and on the other end with an arcuate extension 24 extending upwardly between the casing plates and having formed on its extremity a toothed segment 25. This segment meshes with the toothed pinion gear 20 for operation of the signal arm. The operating member 21 is pivoted at its intermediate portion, at the juncture of the arcuate extension and the lever upon a pivot pin 26 mounted transversely between the casing plates 12 and 15. The forward portion of the operating member 21 is normally urged downwardly by means of a tension spring 27 secured to the casing plate 12 and the lower end of the arcuate extension 24. The action of this spring counter-balances the weight of the signal arm so as to materially decrease the effort required in elevating the signal arm.

It is desirable, in this type of signal, to provide means for retaining the signal arm in various positions so as to indicate the direction in which the operator of the vehicle intends to travel. This is accomplished by the provision of lever engaging mechanism embodying a U-shaped bracket 28 formed integral with or secured to the side of the bracket plate 6, this U-shaped bracket member 28 being provided with a vertical slot 29. Formed on the bracket plate 6 in co-acting relation with the U-shaped bracket 28 is a rack 30 provided with spaced grooves 31. A transversely extending rib is formed on the inner side of the lever 22 opposite the rack 30 this rib being engageable with the grooves formed in the rack for retaining the signal arm in adjusted position. A pin 32 is secured to the lever 22 and moves vertically in the slot 29 formed in the U-shaped bracket thus guiding the movement of the lever and also carrying a tension spring 33 positioned about the pin 32 between the lever 22 and the inner side of the U-shaped bracket 28. From this construction it is obvious that the compression spring will normally urge the lever to be inserted in the grooves. To operate the lever it is necessary to force the same toward the bracket member so as to compress the spring and release the lever rib from the rack. With this arrangement the signal arm may be actuated to assume an upwardly directed substantially vertical position, indicating for the purpose of illustration, a right hand turn and will be retained in this position upon release of the lever. To signal for a left hand turn the lever would be rotated through an arc of substantially 180° so that the arm would be directed downwardly in a vertical position and upon release of the lever this position will be maintained by the arm. To designate that the vehicle is to come to a stop the arm is actuated to an intermediate horizontal position, the rib carried by the lever engaging the central groove for retaining the mechanism in this adjustment. It is readily apparent, however, that additional adjustment may be secured by the provision of numerous grooves in the rack so that the signal arm may be held in positions intermediate the vertical and horizontal.

It is to be noted that comparatively slight movement of the operating lever will cause substantial movement of the signal arm thereby permitting the driver to operate my improved device with little effort and detract his attention but slightly from the operation of the vehicle.

In order to protect the mechanism of the signal from the accumulation of dust and the elements I contemplate the provision of an outer cover casing comprising a pair of disks 34 secured upon the outer extremities of the main shaft 14, these disks being provided with inwardly directed annular flanges and secured in position by nuts threadedly mounted upon the externally threaded extremities of the shaft. This construction will enable the device to be readily disassembled for the repair or renewal of parts and for the purpose of efficiently lubricating the operating mechanism.

It is to be understood that the form of my invention herewith shown and described is to be taken as the preferred example of the same and that various changes as to the shape, size and arrangement of parts may be resorted to without departing from the spirit of the invention, or the scope of the subjoined claims.

Having thus described my invention, I claim:

1. A vehicle signal comprising, in combination, a casing including a pair of spaced plates, a stationary shaft mounted transversely through the plates, an auxiliary shaft mounted adjacent the forward portion of the plates, a signal arm pivotally mounted on the auxiliary shaft, a pinion gear secured to the signal arm and rotatable on the auxiliary shaft, arm actuating means including a lever fulcrumed in the casing, a segment gear formed on the forward portion of the actuating lever adapted to mesh with the pinion for operation of the signal arm, a clamp bracket secured to the casing plates for mounting the signal upon a vehicle frame, means formed on the brackets for retaining the actuating lever in various adjusted positions, means for counter-balancing the weight of the signal arm, and cover plates mounted adjacent the casing plates.

2. A vehicle signal comprising, in combination, a casing including a pair of spaced casing plates, a stationary shaft extending transversely through the center of the casing plates, an auxiliary shaft secured adjacent the forward portion of the casing plates, a signal arm pivotally mounted on the auxiliary shaft and extending outwardly from the casing plates, a pinion gear secured to the connecting end of the signal arm rotatable on the auxiliary shaft, arm actuating mechanism including an off-set lever having a handle formed on one end, a segment gear formed on the opposite end of the lever adapted to mesh with the pinion gear, a bracket secured to the casing plates adapted to support the signal upon a vehicle frame, a U-shaped lever bracket formed on the side of the signal bracket to control movement of the operating lever, means for retaining the operating lever in adjusted positions, a tension spring secured to the operating mechanism adapted to counterbalance the weight of the signal arm, and cover plates secured to the outer ends of the stationary main shaft for enclosing the actuating mechanism.

In testimony whereof I affix my signature.

ARVID D. PERTTU.